Fig. 1

INVENTOR.
WOOD B. HEDGEPETH

Aug. 31, 1965  W. B. HEDGEPETH  3,203,341
CONTINUOUS COOKING DEVICES
Filed July 11, 1960  7 Sheets-Sheet 2

INVENTOR.
WOOD B. HEDGEPETH
BY
ATTORNEY

Aug. 31, 1965  W. B. HEDGEPETH  3,203,341
CONTINUOUS COOKING DEVICES
Filed July 11, 1960  7 Sheets-Sheet 3

INVENTOR.
WOOD B. HEDGEPETH
BY:
ATTORNEY

Aug. 31, 1965   W. B. HEDGEPETH   3,203,341
CONTINUOUS COOKING DEVICES
Filed July 11, 1960   7 Sheets-Sheet 4

INVENTOR.
WOOD B. HEDGEPETH
BY:
ATTORNEY

Aug. 31, 1965  W. B. HEDGEPETH  3,203,341
CONTINUOUS COOKING DEVICES
Filed July 11, 1960  7 Sheets-Sheet 5

INVENTOR:
WOOD B. HEDGEPETH
BY:
ATTORNEY

Aug. 31, 1965  W. B. HEDGEPETH  3,203,341
CONTINUOUS COOKING DEVICES
Filed July 11, 1960  7 Sheets-Sheet 6

*INVENTOR.*
WOOD B. HEDGEPETH
BY: 
ATTORNEY

United States Patent Office 3,203,341
Patented Aug. 31, 1965

3,203,341
CONTINUOUS COOKING DEVICES
Wood B. Hedgepeth, 1000 Peachtree St. NE., Atlanta, Ga.
Filed July 11, 1960, Ser. No. 41,993
3 Claims. (Cl. 99—330)

This invention relates to continuous cooking devices, and is more particularly concerned with a device which will fry a large variety of foods automatically.

In the past many machines have been made to provide continuous, automatic cooking of foods; however, such machines have usually required a very large amount of cooking oil, and usually require frequent changing of the oil. This very large amount of oil used increases substantially the cost of operation.

In prior art machines, effort at controlling temperature of the cooking oil has been limited to control of all burners simultaneously from full-on to off. Therefore, the temperature is usually exceeded, then the oil cools to below the desired temperature, giving an average temperature as set, but with variant extremes. Also, in such control, effort is made to keep all the oil at the same temperature. Since the raw product is coming in cold, the oil on the feed end is cooled, whereas the oil on the opposite end is overheated in an attempt to heat the oil at the feed end. This produces an erratic heat gradient which cooks unsuccessfully.

In addition, prior art machines have many parts and crevices which are very difficult to clean to the degree of sanitation required. This is a decided disadvantage in the commercial preparation of foods due to strict sanitary requirements.

It is, therefore, an object of the present invention to provide a continuous automatic cooker which requires a very small amount of cooking oil.

It is a further object of the present invention to provide a continuous automatic cooker in which the cooking oil must rarely, if ever, be changed.

Another object of the present invention is to provide a continuous automatic cooker which provides a uniform temperature gradient from feed end to discharge end.

Another object of the present invention is to provide means by which a pre-set temperature will be maintained automatically within a very close tolerance.

Still another object of the present invention is to provide an automatic cooker which is very easy to clean and keep sanitary.

A further object of the present invention is to provide a continuous automatic cooker which is easily adapted to a very large variety of foods.

And another object of the present invention is to provide a continuous automatic cooker which is very efficient in operation, economical both to manufacture and to operate, and well designed for a long useful life.

Other and further objects, features and advantages of the present invention will become apparent from consideration of the following specification when taken in conjunction with the accompanying drawings, in which:

In general terms, the present device comprises a frame having a elongate tank mounted thereon. Within the tank and toward the bottom thereof is a plurality of burner tubes. Above the burner tubes is a conveyor to carry the product from one end to the other. Associated with the burner tubes is a plurality of burners and burner control systems. Each of the burner control systems controls one bank of burners.

Oil leveling means are provided to maintain the proper level of oil in the tank; oil circulation is provided to rid the tank of most of the crumbs and other refuse.

Figure 1:
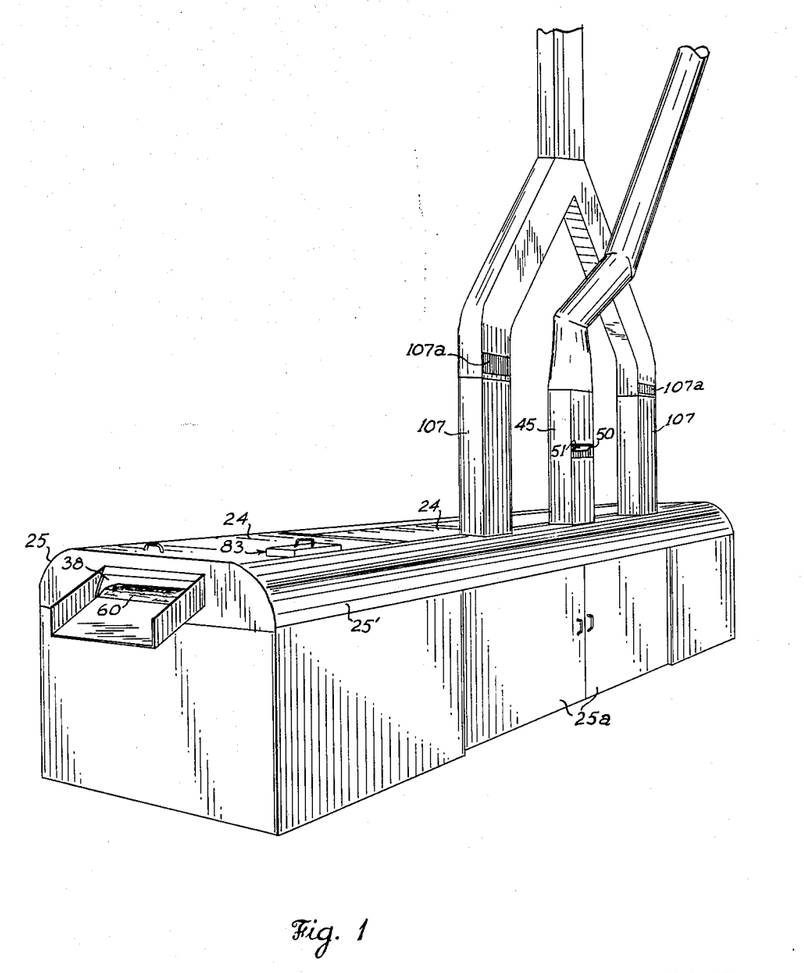
FIG. 1 is a perspective view of one form of the cooker of the present invention.
Figure 2:
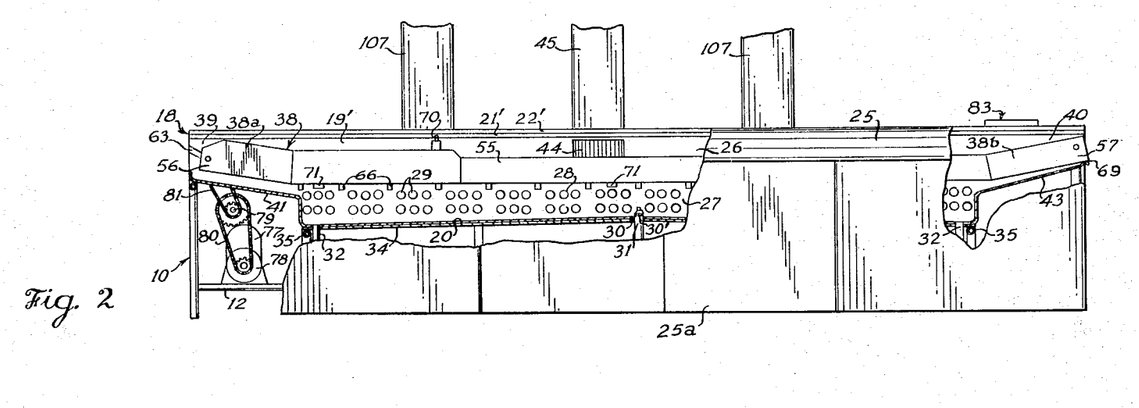
FIG. 2 is a side elevation, partly broken away, of the device of FIG. 1.
Figure 3:
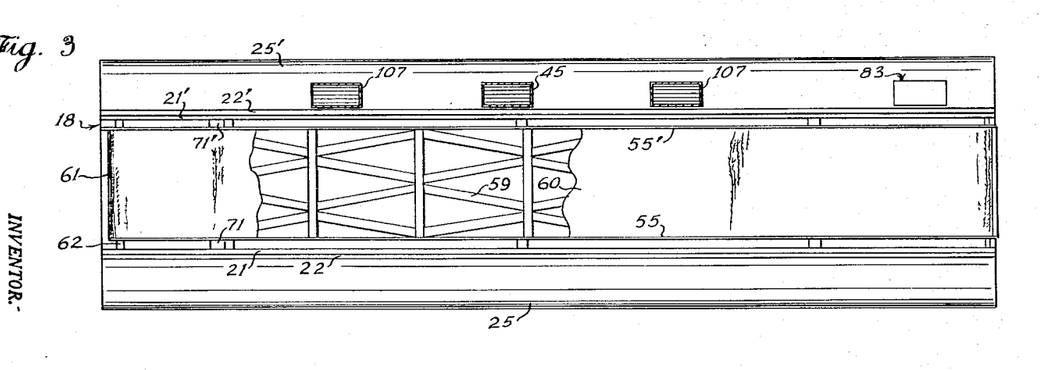
FIG. 3 is a top plan view of the device of FIG. 1, with the covers removed.

Referring now more particularly to the drawings, it will be seen in FIG. 2 that the present device shown by way of illustrating the general concept comprises a frame 10 which is formed of tubular material so that it may be cleaned easily. The frame is made up of a plurality of outer uprights 11 joined by transverse braces 12. Inside the uprights 11 is a plurality of inner uprights 13 joined at their tops to uprights 11 by diagonal pieces 14, and joined at the bottom to transverse members 12. At the juncture of uprights 13 and diagonal members 14 is an angle iron 15 which runs the full length of frame 10.

TANK

A tank 18, as best seen in FIGS. 2–6, is made up of two side walls 19, 19' (FIG. 6) joined by a bottom 20. The upper portions of walls 19, 19' are formed with offsets 21, 22 and 21', 22', respectively, to provide runners for horizontal sliding doors 24. The walls of the tank are turned downwardly and outwardly as at 25, 25' to form a partial enclosure for the frame 10. Sliding doors 25a enclose the lower portion of the device and provide easy access thereto.

Referring to FIGS. 2–5, it will be seen that the tank 18 has an upper portion 26 and a lower portion 27. The lower portion 27 has, in the side walls, a plurality of apertures 28 receiving fire or burner tubes 29 fluid tight therein. The bottom 20 of tank 18 is formed of two slanting portions, having the high point substantially in the middle, as at 30. Substantially at the high point 30 is oil inlet 31 having laterally open holes 30'; and, on each low end is oil outlet 32. The tank 18 rests on a plate 34 which is supported by members 35 on each end thereof, as by welding to longitudinal members 36.

The upper portion 26 of tank 18 houses a conveyor 38. Each end of tank 18 has a protrusion out from portion 27, as at 39 (FIG. 2) on the feed end, and 40 on the discharge end. The bottoms 41 and 43 respectively of protrusions 39 and 40 are slanted upwardly to provide sufficient depth therebetween to hold the cooking oil. Since the bottom of the tank is not rigidly connected to the supporting members 35 but on the plate 34, the tank may expand as it gets hot without damage or stress to the associated members.

Along the bottom of the tank, throughout its length, is insulating materal 42 which prevents undue transfer of heat to the frame. All corners of the tank are rounded to prevent crevices which would be hard to clean.

Figure 11:
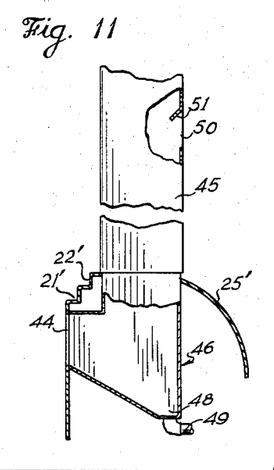
FIG. 11 is a detail view of the steam vent and trap of the present device.

Substantially centrally located in the side wall 19' is a steam vent opening 44 and associated vent pipe 45. As seen in FIG. 11, the opening 44 leads into a steam trap 46 which is an elbow having trap portion 48 with drain pipe 49 which leads to a waste disposal. Within the pipe 45 is an opening 50 to allow a draft in the pipe. Flange 51 prevents condensed moisture from going out the opening 50, and causes it to drain into the trap portion 48.

CONVEYOR

The conveyor 38 of the present device comprises a pair of side walls 55 and 55', turned upwardly on each end as at 56 on the feed end, and 57 on the discharge end. Between the side walls 55, 55' and at the bottom edge thereof is a lattice-work 59 which supports the top flight of a conveyor belt 60.

At the feed end 38a of conveyor 38 is a drive roller 61 on a shaft 62 carried in downwardly slanting open slots 63 in the respective side walls of the tank, allowing easy removal of the shaft when desired. The lattice-work 59 has a ramp-like feed end part as at 59a to provide a support for the belt 60 as it comes partially downwardly from the drive roll 61.

The discharge end 38b of conveyor 38 is provided with an idler roller 64. The lattice-work 59 has an opposite portion turned upwardly as at 59b to direct belt 60 up to the roller 64.

To support the return flight of conveyor belt 60, there is provided a plurality of pairs of brackets 66, each pair supporting a transverse roller 67. The belt 60 is carried by these rollers 67 in order to prevent the belt from dragging on the burner tubes 29.

The sole support of the feed end of the conveyor 38 is the shaft 62; the sole support of the discharge end of conveyor 38 is the edge of the tank at 69; therefore, it will be seen that the entire unit may be lifted and pivoted about the shaft 62. To facilitate the lifting of the conveyor, as for cleaning, lift hooks 70 are provided on each end of the conveyor. To align the conveyor as it is replaced, U-shaped brackets 71 and 71' are provided along the bottom edge of the conveyor. The bracket 71' is wider, providing a wider space between the conveyor wall 55' and the tank wall 19' to leave room for drive mechanism.

Each of the brackets 71, 71' is disposed above one of the burner tubes 29. The brackets are normally slightly above the burner tubes; however, if the conveyor sags, the brackets 71, 71' will support the conveyor by resting on the burner tubes.

Figure 12:
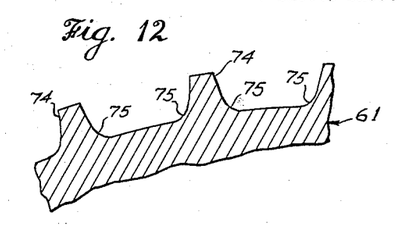
FIG. 12 is a partial transverse cross sectional view of the drive roller of the present device.
Figure 13:
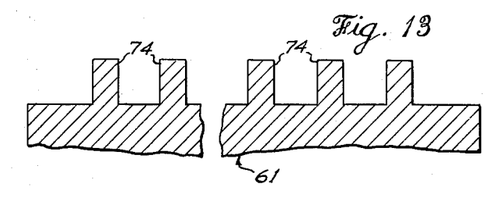
FIG. 13 is a partial longitudinal cross sectional view of the drive roller of the present device.
Figure 14:
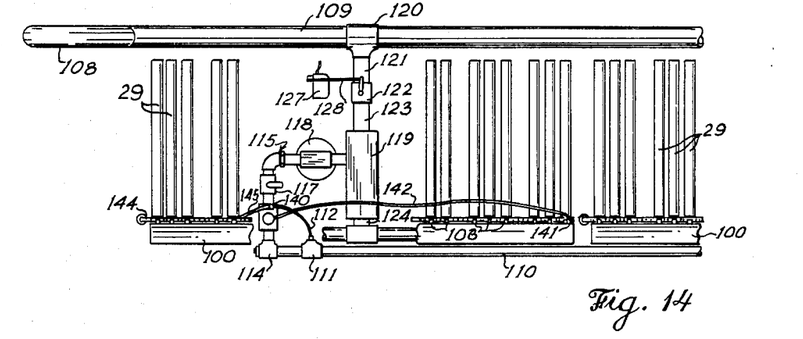
FIG. 14 is a plan view of the burner system of the present device.

The belt contemplated for use on the present device is a stainless steel wire belt of the type known as a balanced weave wire belt. Though it is usually recommended that this type belt be pulled, with the present arrangement excellent results have been achieved by pushing the belt. Attention is directed to FIGS. 12 and 13 of the drawings which show enlarged sections of the drive roller. It will be seen that the teeth 74 are formed with a curved base portion 75 which conforms to the spiral formation of the belt. In longitudinal cross section, the teeth have straight sides to fit into the openings of the belt. Due to the fact that the belt is pushed rather than pulled, the belt will, under its own weight, lie on and conform with the lattice-work support 59.

The drive for the conveyor is provided by a unit mounted on the frame at the feed end of the device. An integral unit including a motor 77 and gear reduction unit 78 drives a jack shaft 79 through a chain 80. In turn, a chain 81 on the jack shaft drives drive roller 61.

OIL LEVELER

At the discharge end of the device, there is mounted an oil leveler generally designated at 83 (FIG. 2). This device maintains the proper level of cooking oil within the tank 18. The oil leveler comprises a substantially rectangular tank 84 (FIG. 7) having a supply pipe 85 which leads to an oil supply tank (not shown). Centrally located within the tank 84 is an adjustable dam 86. On the same side of dam 86 as supply pipe 85 is a connecting pipe 88 which communicates with tank 18. On the opposite side of the dam 86 is a return pipe 89 which leads back to the oil supply tank (not shown).

Figures 7, 8, 10:
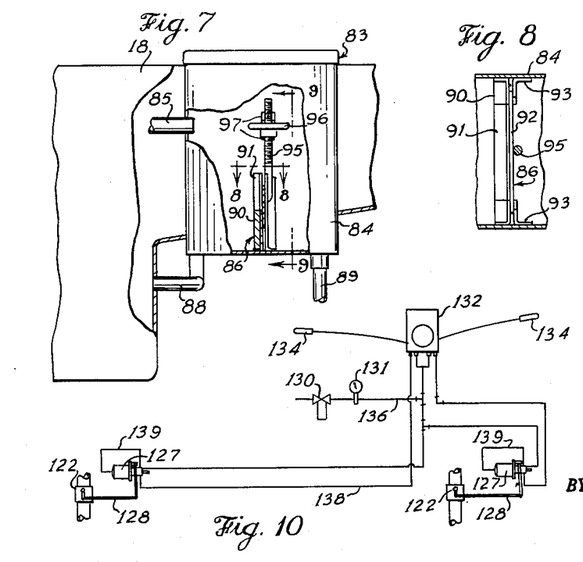
FIG. 7 is a side elevational view, partially broken away, of the oil levelling tank used in the present device.
FIG. 8 is an enlarged cross sectional view taken on line 8—8 of FIG. 7.
FIG. 10 is a schematic representation of the controller unit used in the present device.
Figure 9:
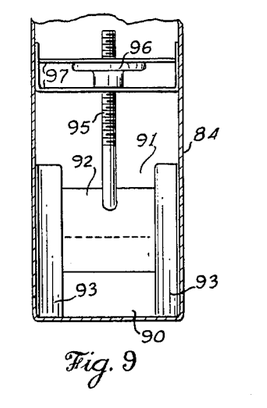
FIG. 9 is an enlarged cross sectional view taken on the line 9—9 of FIG. 7.

The dam 86 comprises a plate 90 which is secured within and to the tank 84 permanently, as by welding. The plate 90 has a cutout as at 91. A plate 92 is vertically slidable between plate 90 and corner strips 93; therefore, it will be seen that the effective height of the dam may be varied by raising or lowering the plate 92. To vary the height of the plate 92, there is provided a threaded shaft 95 which is attached to plate 92, and is carried by an internally threaded handwheel 96. The handwheel 96 is supported by transverse braces 97 having apertures to receive the shaft 95. Thus, the turning of handwheel 96 will raise or lower the threaded shaft 95, hence the plate 92.

It is contemplated that the top edge 98 of plate 90 will be aligned with the usual oil level in the tank. Oil is supplied through the supply pipe 85 and passes through the pipe 88 to tank 18. Until proper oil level is reached, since the level of oil in tank 18 will become the same as the level of oil in tank 84, any more oil coming in through pipe 85 will run over dam 86, out pipe 89 and back to the oil supply tank. If it be desired to raise the level of oil in the tank 18, the plate 92 is raised to the desired level, and oil is allowed to flow in.

In operation of the device, oil may be allowed to flow very slowly through the pipe 85. As oil is used, it will be replaced, so that the proper oil level will always be maintained.

BURNER SYSTEM AND TEMPERATURE CONTROL

The burners and controls are best shown in FIGS. 6, 10, 14 and 15 of the drawings. The burners comprise the burner or fire tubes 29 which extend the full width of the tank 18, and are open on each side of the tank. Outside the wall 19 of the tank 18 is mounted a manifold 100.

Here, it should be understood that the burners are divided into a plurality of banks of burners, and the entire burner system is multiplied by the number of banks of burners. The present device shown by way of illustration has two banks of burners; hence, there are two complete burner control systems. However, since all systems are the same, only one control system will be described in detail.

The manifold 100 is mounted by means of brackets 101 secured to the frame 10 as at 102. Axially aligned with each of burner tubes 29 is a burner nozzle 103 which directs a flame into the burner tube 29. At the opposite end of tube 29 is a baffle 104 which is made of a piece of sheet material twisted helically. This baffle 104 slows the hot gases from the nozzles so that the heat may be absorbed by the surrounding area. As the gases pass out the tube 29, they enter the flue box 105, communicating with flue pipe 107 which carries off the waste gases. A fan (not shown) may be provided to assist in disposing of the waste gases. With the fan running at a constant speed, the vents 107a may be adjusted to vary the draft through the burner tubes 29.

To supply the proper gas-air mixture to the manifold 100 there is provided a blower 108 supplying air supply pipe 109 which extends down one side of the machine. On the opposite side of the machine is a gas supply pipe 110. A T fitting is inserted at 111 (FIG. 14) having a tubing 112 which leads to the usual safety mechanism for pilot lights. Beyond T 111 is a T 114 which turns the gas supply pipe inward to feed branch 115 of the gas line. Included in the branch 115 is a manual cut-off valve 117 and an atmospheric regulator 118. The branch then leads into a gas-air mixer 119.

The air supply pipe 109 includes a T fitting 120 which communicates with pipe 121 in which is a valve 122, described below. Pipe 123 then leads to gas-air mixer 119. From gas-air mixer 119, pipe 124 leads up to T 125, branches out and feeds the mixture to manifold 100.

The gas-air mixer 119 is a device which allows gas substantially at atmospheric pressure to be picked up by a stream of air traveling longitudinally of the device. One such device is the Eclipse "Vari-Set Mixer." If a large amount of air be forced into the mixer, a large amount of gas is picked up and mixed with the air; if a small amount of air be forced in, only a small amount of gas is picked up. Therefore, the gas-air mixture is determined by the amount of air allowed to enter the mixer.

Figure 4:
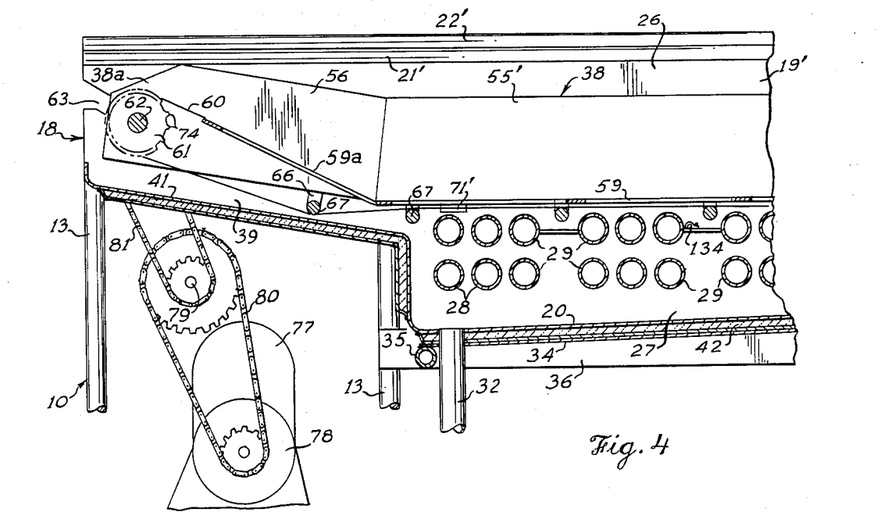
FIG. 4 is a longitudinal cross sectional view of the feed end of one form of the present invention.
Figure 5:
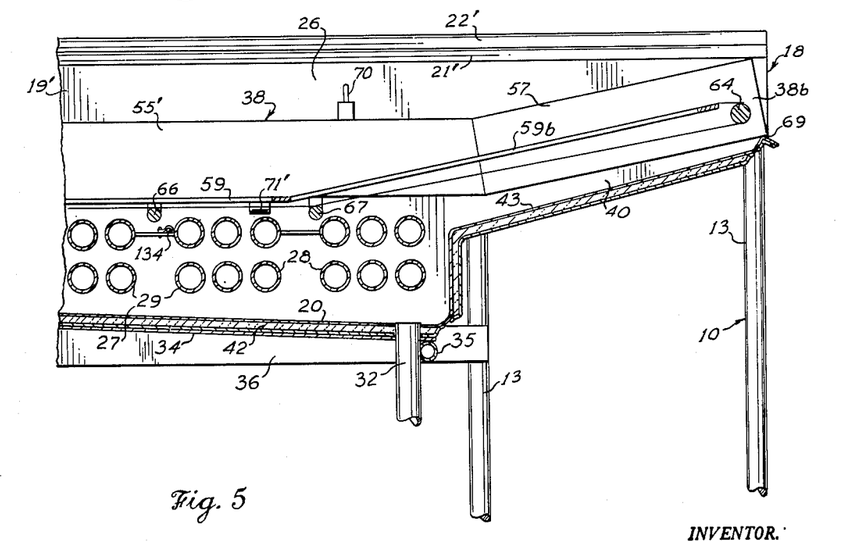
FIG. 5 is a view, similar to FIG. 4, of the discharge end of the device.
Figure 6:
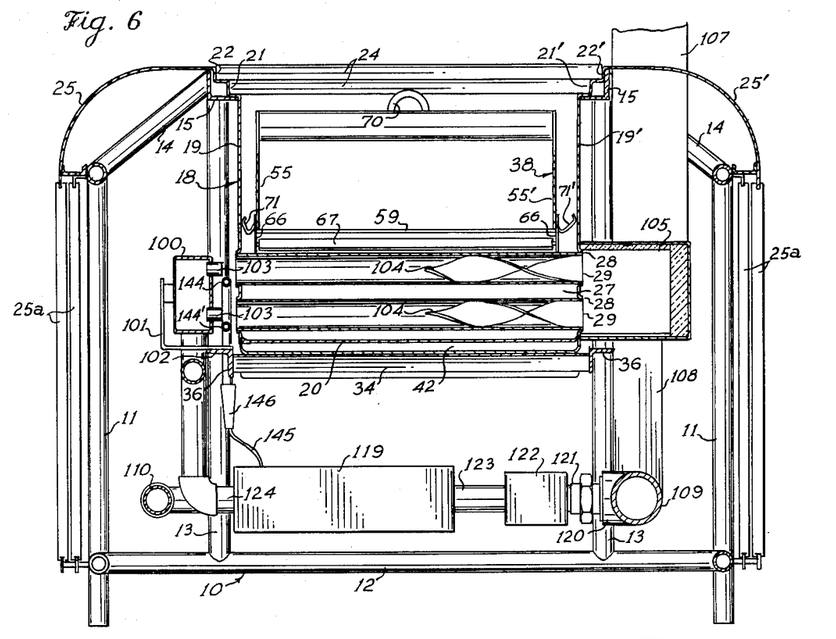
FIG. 6 is a transverse cross sectional view of the device of FIG. 1.

The valve 122 is inserted to control the amount of air entering mixer 119. This valve is opened or closed by an air motor 127 through link 128. The control for the air motor 127 is a thermostatically operated control unit such as the Minneapolis-Honeywell Recorded-Controller. Since this device is well known in the art, detailed description of the manner of operation is considered unnecessary. Referring to FIG. 10, it will be understood that a source of compressed air (not shown) supplies air through a pressure regulator and filter 130, to pressure gauge 131, and to a controller, designated at 132, the latter having a sensing bulb 134 mounted closely adjacent a burner tube, as seen in FIG. 4, and the desired temperature is set on the controller.

Here, it should be noted, that the bulb 134 controls the temperature of the tube, as opposed to the temperature of the oil itself. With this arrangement, the burner tube never exceeds the frying temperature. If the bulb be too far from the tube, the burners will remain full-on until the bulb reaches the pre-set temperature. This increases the oxidation of the oil and leads to much poorer operation. It has been found that the bulb should be mounted about ¼" to ⅜" from the tube for best results. This allows gradual, even heating of the oil without scorching or excessive heating of the oil.

If the bulb 134 be below the desired temperature, air will be allowed to pass from supply line 136 through controller 132, to line 138 which operates air motor 127 and opens valve 122. This allows more air to pass into the mixer 119, and causes a large volume of gas-air mixture to enter manifold 100 to be burned. If the bulb 134 be at or above the set temperature, air will be blocked through controller 132, but will go through line 136 to air motor 127, through branch 139, and force the air motor in the opposite direction, thus closing valve 122. This stops the flow of air; hence, the flow of gas-air mixture to the manifold 100. Though these are the two extremes, it should be understood that any point between may satisfy the conditions. Therefore, the flame may be from full-on, in an infinite number of increments to completely off. By this arrangement it has been found that the temperature may be maintained as closely as ±1° F.

Figure 15:
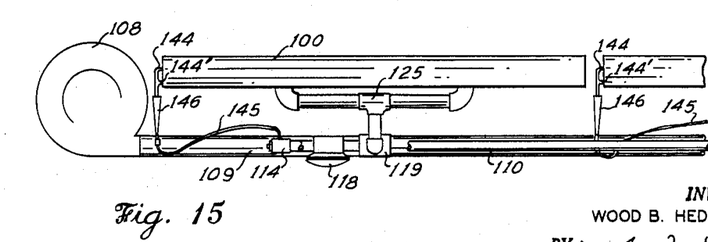
FIG. 15 is a side elevational view of FIG. 14.

A pilot light is provided primarily as a safety feature and to light the burners initially. Though the burners are never completely off, when at their lowest there is danger that they may be inadvertently blown out. The pilot light will immediately relight the burners in such case. The tubing 112 feeds gas to the safety cut off 140. This is the device well known in the art which will allow gas to pass as long as the bulb 141 remains hot. From FIG. 14 it will be seen that the tube 142 leads to bulb 141 which is mounted in the flame of pilot runalong 144. As best seen in FIG. 15, tube 145 leads from safety valve 140 to pilot mixer 146, and to pilot runalongs 144, 144'. A series of apertures is provided at the top of each runalong 144, 144' so that, when one end is ignited, the flame will travel the full length of the runalong. Therefore, the pilot runalong will stay lit with little chance of going out. If one section is blown out, it will be relighted from the section that is still lighted.

FEED HOPPER

Figures 19, 20, 21:
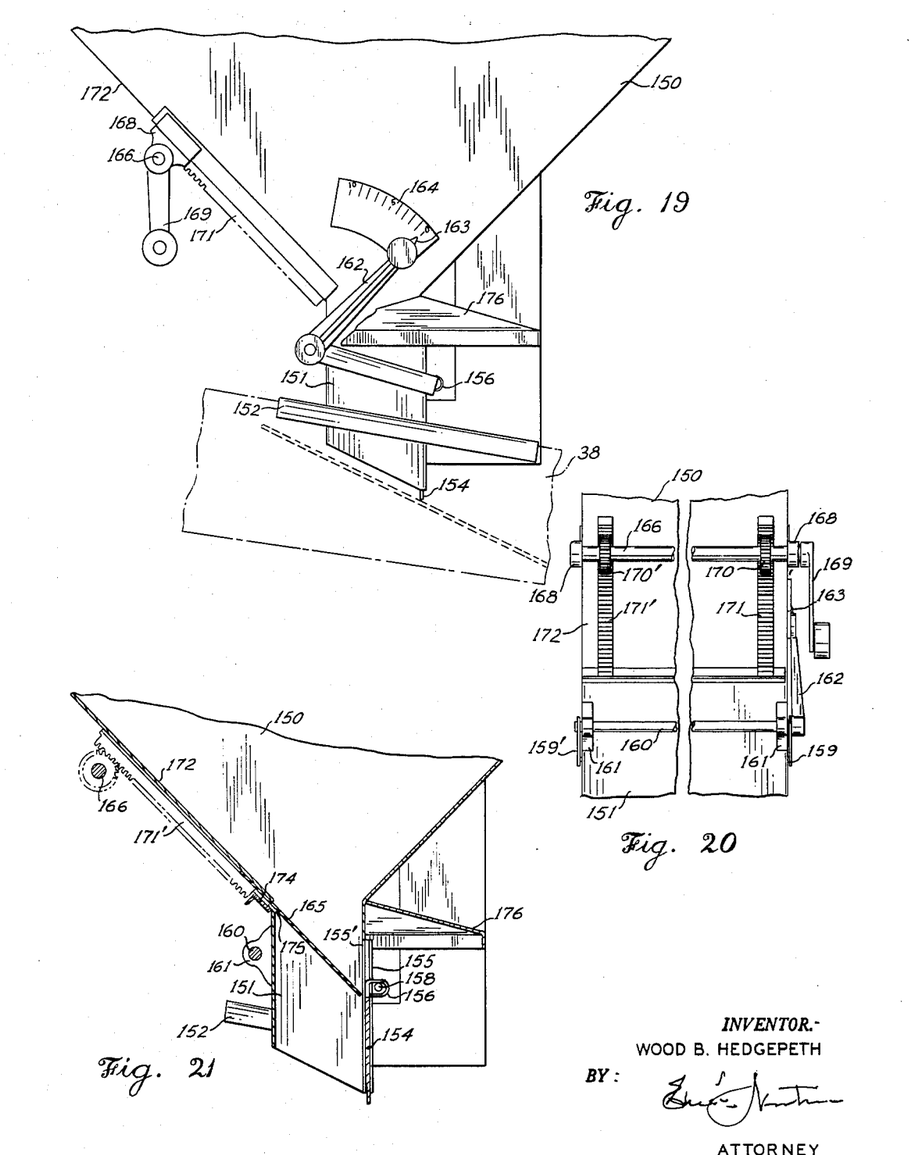
FIG. 19 is a side elevation, partially broken away, of the feed hopper for use with the present device.
FIG. 20 is a partial rear view of the feed hopper shown in FIG. 19.
FIG. 21 is a longitudinal cross sectional view of the hopper shown in FIG. 19.

For some products to be cooked, such as nuts, pumpkin seeds, sunflower seeds and the like, it is desirable to have a hopper to dispense the product automatically. The hopper of the present invention comprises a bin 150 (FIG. 19) having a depending spout portion 151. Channel members 152 are adapted to fit over the side walls of the conveyor shown in broken lines at 38. To vary the rate of feed of the hopper, a pair of adjustable detaining plates 154 and 165 is provided. The former plate 154 affects flow away from the spout and gauges the thickness of the layer of product to be placed on the conveyor belt 30 by acting as an inverted dam between the leading part of the spout and the belt. If the lower edge of the plate 154 be one inch from the conveyor belt, a one inch thick layer of product will be placed on the belt. The lower edge may be varied in height as the plate 154 is vertically slidably engaged in opposed flanges 155 and 155'. The top edge of plate 154 is bent around to provide loops 156 by which the plate may be manipulated. A rod 158 passes through loops 156 and is mounted on each end by arms 159, 159'. The arms 159, 159' are, in turn, mounted on a shaft 160 carried by bearings 161 on the hopper spout. One end of shaft 160 also mounts an arm 162 which is provided with a pointer 163 riding across a graduated scale 164. With this arrangement, it will be seen that the pointer 163 may be placed on a given number on the scale 164. The movement of arm 162 will rotate shaft 160, hence arms 159, which will, in turn raise or lower plate 154.

It is also desirable to vary the rate of feed of product to the spout portion 151. Therefore, the other plate 165 is provided as a sliding gate to vary the cross sectional area of the spout portion. To facilitate easy adjustment of plate 165, a rack and pinion is provided. The arrangement includes a shaft 166, carried by bearings 168 on the bin, and provided with a crank handle 169. Mounted on shaft 166 for rotation therewith are two pinion gears 170, 170'. Racks 171, 171' are mounted between pinions 170, 170' and the slanted rear portion 172 of bin 150. The lower ends of racks 171, 171' are rigidly attached, as by welding, to an angle iron 174, which also carries plate 165. A slot 175 is provided in the rear of the spout to receive the plate 165.

Thus, it wil be understood that, as the crank 169 is rotated, the shaft 166 and associated pinions 170, 170' will rotate therewith. The pinions 170, 170' will move racks 171, 171' which will adjust the plate 165. The hood 176 covers the opening in the cooker to prevent refuse from inadvertently dropping in.

TOP SUBMERGER

Some products, such as onion rings, will tend to float on top of the cooking oil, and will not cook evenly on all sides. In order to keep such products beneath the surface of the oil, a device is provided which positively holds such products well under the oil.

Figure 16:
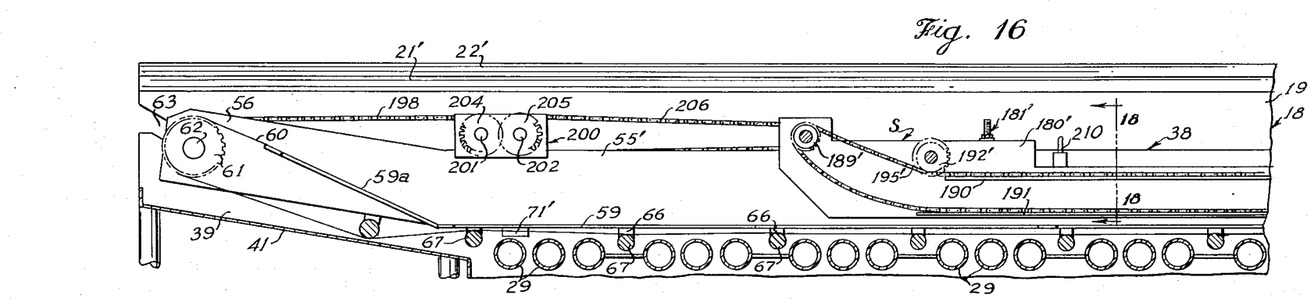
FIG. 16 is a longitudinal cross sectional view of the feed end of the device, showing the top-submerger in place.
Figures 17, 18:
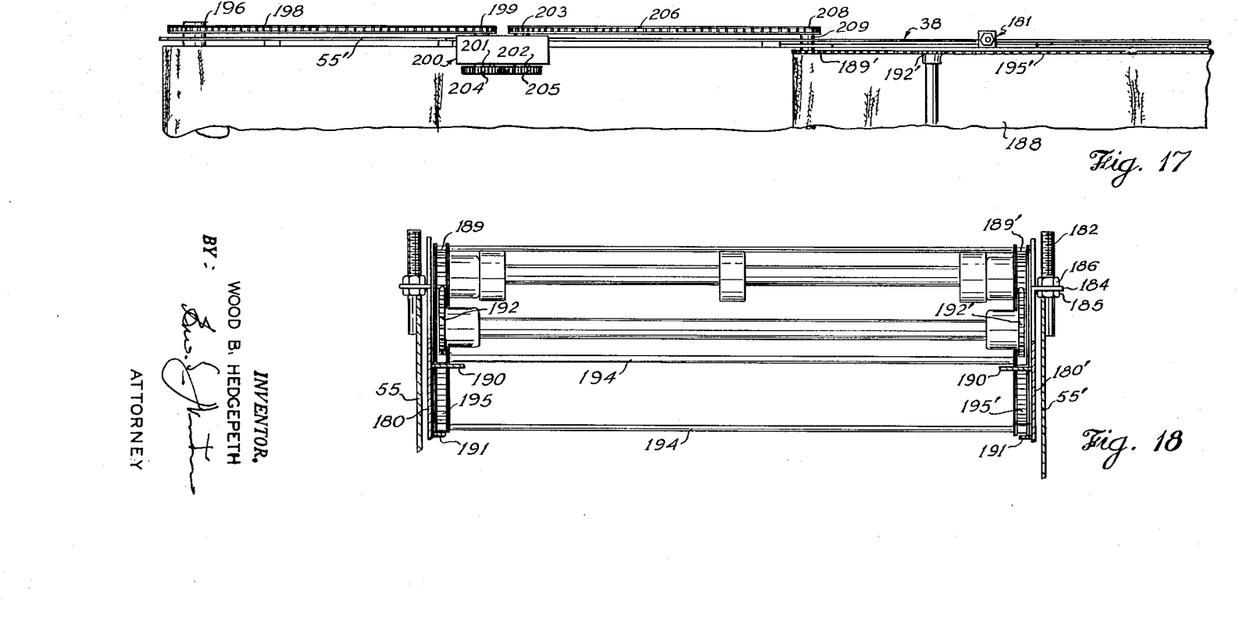
FIG. 17 is a partial plan view of the device as shown in FIG. 16.
FIG. 18 is an enlarged cross sectional view taken on the line 18—18 of FIG. 16.

Referring to FIGS. 16–18, it will be seen that the submerger S comprises a pair of side walls 180, 180' which are so spaced as to fit within the walls of the conveyor 38. The submerger is supported from the conveyor 38 by adjustable brackets 181. The bracket 181 comprises a threaded stud 182 which is welded to the side of the conveyor 38 with the threaded portion protruding above the wall of the conveyor. An apertured plate 184 is welded to the submerger with the aperture aligned to receive stud 182. The plate 184 rests on stop nut 185, and is held in place by lock nut 186. To vary the height of the submerger above the conveyor, one need but to screw the nuts 185, 186 to the proper height.

To hold the product beneath the oil, a belt 188 is provided. The belt 188 is driven by sprockets 189, 189' and supported along its length by runners 190 and 191 for its upper and lower flights respectively. Idler sprockets 192, 192' are provided to hold the belt 188 on the runner 191.

The belt which is contemplated for use on the submerger is the balanced weave belt as used on the conveyor. However, for the submerger, stiff sleeves 194 are placed over the crimped transverse wires of the belt, and the sides of the belt are attached to chains 195, 195'. The sleeves 194 provide support throughout the width of the belt to prevent sagging, and the chains 195, 195' provide an easy method of driving the belt.

The drive sprockets 189, 189' are driven from the conveyor drive roller 61. Sprocket 196 is mounted on shaft 62, and chain 198 is trained over sprocket 196 and sprocket 199 of gear unit 200. The gear unit 200 has two shafts 201, 202 with sprockets 199, 203 on one end of the respective shafts, and meshing gears 204, 205 on the opposite end of the shafts 201, 202. Chain 206 from sprocket 203 drives sprocket 208 on shaft 209, which shaft carries drive sprockets 189, 189'. With this arrangement it will be seen that the gear unit 200 reverses the direction of sprockets 189, 189'. Therefore, the top flight of conveyor belt 60 and the bottom flight of submerger belt 188 will travel in the same direction. The submerger drive should be so designed that the lineal speed of the two belts will be exactly the same.

From the above, it is seen that the submerger unit is merely resting on the conveyor and may be easily removed. Lift hooks 210 are provided to facilitate lifting the submerger when not in use.

Though only the feed end of the submerger has been shown and described, it should be understood that the discharge end is similarly constructed, and has only idler sprockets to carry the belt.

OPERATION

From the foregoing, the operation of the device should be apparent. The proper devices such as the feed hooper or the top submerger are put in place, and the dam 86 in oil leveler 83 is adjusted to the desired height. Oil is then allowed to flow from the oil storage tank (not shown) through pipe 85 into the levelar 83. The oil will pass through pipe 88 to fill the cooker tank 18. When the desired level has been reached, the incoming oil is slowed to a trickle.

The pilot is lit by depressing the reset button, and lighting the pilot runalong. When the bulb 141 reaches a sufficiently high temperature, the pilot will remain lit. The valve 117 is then turned on, the blower 108 started, and the desired temperature set on the controller 132. The burners will now adjust automatically to maintain the set temperature or temperatures. After the proper temperature has been reached, the main drive is started, and cooking may begin.

In the event a product such as nuts is to be cooked, it will be desirable to use the feed hopper. In such case, the flanges 152 are hooked over the side walls of the conveyor 38 on the feed end. The gates 154 and 165 are adjusted for proper feed, and the storage area 150 is filled with the product. Feeding will then be automatic as long as the looper is supplied with product to be cooked.

If a product that floats in the oil is to be cooked, the top submerger will be put in place prior to operation. The entire assembly should be lowered into the conveyor, and the apertures in plates 184 aligned with studs 182.

The nuts 185 and 186 are then adjusted to give the desired distance between conveyor belt 60 and submerger belt 188. The drive chains are installed, and the device started. The product is fed in the usual way; and, when the floating product reaches the submerger, the product will be forced under the surface of the oil by the submerger belt 188. Since the belts 60 and 188 travel at the same lineal speed, the product will not be chaffed or otherwise damaged.

Therefore, it will be seen that the present device provides a continuous, automatic, versatile cooker which will meet the most demanding needs. Since the doors 24 are in place throughout the operation, most air is kept out, and oxidation of the oil is restricted. The accurate temperature control allows lower operating temperatures, which further restricts oxidation of the oil.

The conveyor belt 60 carries a large proportion of the crumbs and other refuse to be discharged at the discharge end of the device. Other solid particles may be removed by oil circulating means, including conventional strainers and filters. Since the oil flows from the central high point to the two end low points, much of the solid refuse is carried with the oil and may be drained off through pipes 32. However, there is a considerable amount of suspended matter in the oil at all times. With the burner arrangement of the present device, the burner tubes do not, at any time during operation, get cold; therefore, there will always be sufficient agitation around the tubes to prevent the precipitation of refuse on the tubes.

When it is necessary to clean the device, the doors 24 are removed, and a hoist is attached to the lift rings of the conveyor. The conveyor may be lifted at one end, and pivoted about the drive shaft, giving access to the tank without fully removing the conveyor. Or, if desired, the conveyor may be removed entirely by merely removing the drive chain and lifting the drive shaft out of slot 63. The open door runners will allow thorough cleaning; the rounded corners of the tank will not hold grease or refuse; thus, the entire machine may be cleaned to the degree of sanitation required.

Therefore, it will be seen that the present invention provides an efficient automatic continuous cooker which is easily adapted to a very wide variety of products, and is very economical to operate. It will, of course, be understood that the invention is not limited to the particular details herein disclosed, but many changes and modifications may be made, and the full use of equivalents resorted to without departing from the spirit or scope of the invention as defined in the appended claims.

I claim:

1. In a deep fat fryer, a vat for cooking oil, an inlet member for oil, a conveyor for passing food through the oil, the oil tending to become removed from the vat by the emergence of the food, a substantially smaller leveling tank disposed adjacent said vat and having a partition dam therein for dividing the tank into two compartments side by side, conduit means below the dam for connecting one compartment to said inlet member, a source of make-up oil, means for constantly supplying the make-up oil to said compartment, and conduit means connecting the other compartment to said source, whereby when the make-up oil is added the level in the first mentioned compartment will rise no higher than the dam, but spill over the dam into the other compartment and be returned to the source.

2. A cooker for frying foods in oil comprising a main tank of oil having vertical walls and a bottom sloped downwardly to form a pocket for the collection of refuse particles, means for discharging the refuse from the pocket, conveyor means within said tank for moving food through said oil, one of said walls having an aperture therethrough above the normal oil level to vent steam from the tank, a trap below the level of the aperture and provided with a vertical vent pipe, the vent pipe being provided with an opening above the trap for passage of draft air, a deflector at the upper marginal portion of the opening to deflect descending condensed moisture toward the axis of the pipe and away from the opening so that the moisture will tend to fall into the trap, a leveling tank having a partition dam therein for dividing the leveling tank into two compartments side by side, conduit means connected between one compartment and a source of make-up oil, means for continuously supplying oil from the source to the one compartment, and conduit means connected to the other compartment for returning to the source oil passing over the dam from the one compartment to the other compartment.

3. A cooker for frying foods in oil comprising a main tank of oil having vertical walls and a bottom sloped downwardly to each end thereof from a generally medial line so as to form end pockets for the collection of refuse particles, exit pipes for the pockets, horizontal fire tubes within said tank for heating the oil, burner means for producing flames in said tubes, burner controls for the burner means, each control having a temperature sensing element adjacent a tube and substantially in contact therewith so as to make the control responsive to the temperature of the tube without requiring heat conduction of the oil, a pair of spaced upper and lower conveyors one above the other above said burners for passing the food through the oil, means for moving the conveyors in the same direction, the lower conveyor being longer than the upper conveyor and projecting beyond the upper conveyor toward the entrance end of the tank, a bin over the projecting end of the lower conveyor, an inverted member carried by the bin and movable toward and away from the projecting end of the lower conveyor for regulating the feed of material to the lower conveyor, one of the walls having an aperture therethrough above the normal oil level to vent steam from the tank, a vent pipe communicating with said aperture, a trap below the level of the aperture, the vent pipe being provided with an opening above the trap for passage of draft air, a deflector at the upper marginal portion of the opening to deflect descending condensed moisture toward the axis of the pipe and away from the opening so that the moisture will tend to fall into the trap, a leveling tank having a partition dam therein for dividing the leveling tank into two compartments side by side, an oil inlet means connected between one compartment and the main tank below the level of the dam, a source of make-oil, means for continuously supplying oil from the source to the one compartment, and conduit means for returning to the source oil passing over the dam from the one compartment to the other compartment.

References Cited by the Examiner

UNITED STATES PATENTS

| | | | |
|---|---|---|---|
| 1,598,435 | 8/26 | Gottschalk | 99—405 |
| 1,674,555 | 6/28 | Leone et al. | 99—404 X |
| 1,737,363 | 11/29 | Ehrhart | 99—405 |
| 1,760,979 | 6/30 | Ferry | 99—443 |
| 1,788,925 | 1/31 | McKee | 158—119 |
| 1,919,185 | 7/33 | Chapman | 99—404 |
| 1,935,108 | 11/33 | Brooks | 126—389 |
| 1,942,132 | 1/34 | Blinn et al. | 99—354 X |
| 2,042,655 | 6/36 | Ferry | 99—405 |
| 2,053,568 | 9/36 | Levin | 99—408 |
| 2,103,529 | 12/37 | Hartwig | 158—119 |
| 2,243,710 | 5/41 | Lagaard | 126—389 |
| 2,269,827 | 1/42 | Mendoza | 198—56 |
| 2,278,730 | 4/42 | Neuman | 198—56 |
| 2,286,013 | 6/42 | Roth | 99—405 |
| 2,287,396 | 6/42 | Roth | 99—403 X |
| 2,292,156 | 8/42 | Pitman | 99—331 X |
| 2,319,561 | 5/43 | Scharsch | 99—404 |
| 2,337,481 | 12/43 | Lowe | 99—408 |
| 2,525,213 | 10/50 | Doolin | 126—389 X |
| 2,546,163 | 3/51 | McBeth | 99—408 X |
| 2,549,283 | 4/51 | Ashton | 99—408 |
| 2,578,129 | 12/51 | Daugherty | 99—408 |
| 2,652,767 | 9/53 | Childs | 99—408 |
| 2,709,955 | 6/55 | Hunter | 99—404 |
| 2,712,308 | 7/55 | Keating | 126—391 |
| 2,732,789 | 1/56 | Herberg | 99—404 |
| 2,799,288 | 7/57 | Knight | 158—119 X |
| 2,808,879 | 10/57 | Markley | 158—118 |
| 2,833,203 | 5/58 | Benson | 99—404 |
| 2,853,937 | 9/58 | Peck | 99—484 |
| 2,860,569 | 11/58 | Pitman | 99—404 |
| 2,888,068 | 5/59 | Flynn | 158—118 |
| 2,907,268 | 10/59 | Doolin | 99—404 X |
| 2,966,840 | 1/61 | Forsyth | 99—404 |

FOREIGN PATENTS 462,379    4/27    Germany.

ROBERT E. PULFREY, *Primary Examiner.*

JOSEPH D. BEIN, N. ANSHER, JEROME SCHNALL,
*Examiners.*